Patented Sept. 19, 1933

1,927,414

UNITED STATES PATENT OFFICE 1,927,414

MANUFACTURE OF ALIPHATIC ACIDS AND ESTERS

Horace Finningley Oxley, Spondon, near Derby, England, assignor to Celanese Corporation of America, a corporation of Delaware No Drawing. Application August 5, 1930, Serial No. 473,287, and in Great Britain August 22, 1929

21 Claims. (Cl. 260—116)

This invention relates to the manufacture of acetic acid and other carboxylic acids, by processes of the kind in which methyl alcohol or other primary aliphatic alcohol in the free or combined state is catalytically combined with carbon monoxide.

A process for producing acetic acid from methyl alcohol and carbon monoxide in the presence of an acid catalyst containing a radicle of an oxy acid of a non-metallic element, such for instance as phosphoric acid, or other acid derived from an oxide of phosphorus, is described in U. S. application S. No. 138,116 (now Patent No. 1,864,643), filed 27th September, 1926; and in the corresponding British Patent No. 283,989. In this process a gaseous mixture containing methyl alcohol and carbon monoxide is passed preferably under pressure over or through a catalytic mass consisting of or comprising a phosphoric acid at elevated temperatures, preferably between 300 and 400° C. The acetic acid may be obtained either in the free state and/or in the form of its methyl ester, the proportion of free acetic acid depending inter alia on the proportion of water vapour present in the reaction mixture, and on the relative proportion of the methyl alcohol and carbon monoxide. The phosphoric acid may be employed either in the form of the ortho-, pyro or meta-phosphoric acid, or any mixture of these acids. The particular form of phosphoric acid or the particular mixture of phosphoric acids actually present during the reaction, depends upon the conditions under which the reaction is conducted. Instead of methyl alcohol, compounds capable of decomposing with the formation of methyl alcohol under the conditions of the reaction may be employed, either alone or in admixture with methyl alcohol; thus, for instance, dimethyl ether or a methyl ester such as methyl formate or methyl acetate may be employed. When methyl formate is used in this way, isomerization takes place, the methyl formate being transformed into acetic acid. As indicated in the said application the process is also applicable to the synthetic production of higher fatty acids or their esters from higher primary aliphatic alcohols.

As indicated in the specification referred to, the apparatus employed should be proof against corrosion by acids and by carbon monoxide. For instance, the parts in contact with acetic acid may be made of or lined with copper, while those containing phosphoric acid or in contact therewith may have a lining of graphite, or gold, or be made of or lined with copper.

It has been discovered that in the manufacture of acetic acid by the methods forming the subject-matter of U. S. application S. No. 138,116, when using reaction vessels which consist of or are lined with gold, platinum, or other metal or material which resists the action of the phosphoric acid or other acid catalyst employed, the yield of acetic acid can be increased by the use of a promoter formed by the incorporation of copper or a compound of copper in the phosphoric acid or other acid catalyst employed (see U. S. application S. No. 338,338, filed 7th February 1929).

It has now been found that metals of atomic weight between 50 and 60 and the salts and other compounds of such metals are capable of promoting the catalytic action of the inorganic acid catalysts hereinbefore referred to.

The present invention therefore consists in a process for the manufacture of fatty acids by the action of carbon monoxide on alcohols, either in the free or combined state, in the presence of phosphoric acid or other inorganic acid catalyst together with a promoter being a metal having an atomic weight between 50 and 60 or a compound of said metal or a salt or other compound of such metal. The promoters of the invention are hereinafter referred to as promoters comprising a metal of atomic weight between 50 and 60. Likewise the promoters containing iron, iron salts or compounds are all hereinafter referred to as promoters comprising iron.

The invention is especially applicable to the manufacture of acetic acid and/or methyl acetate by the action of carbon monoxide on methyl alcohol or its esters or ethers.

As promoter metals it is preferred to use iron or manganese, but vanadium, chromium, cobalt or nickel may likewise be employed.

The promoter may be incorporated in the catalyst either in the form of the metal or of a salt or other compound thereof. Thus, iron or manganese, for instance, can be added to a phosphoric catalyst in the form of the hydroxide, acetate, or formate.

The metals or metal compounds employed may be used alone or in admixture with each other or with copper or copper compounds or other promoters, or with other metals or metal compounds or materials that do not exert a deleterious influence on the reaction.

The promoter incorporated with the phosphoric acid or other acid catalyst appears to exert a powerful influence on the course of the reaction. Very small proportions of the promoter are capable of modifying the reaction so as to enable a very satisfactory conversion of the methyl alcohol into acetic acid. For instance, the presence of less than 1% of the metal in the phosphoric acid appears to be sufficient to reduce the loss of methyl alcohol to a marked degree.

The apparatus, conditions and general procedure adopted in carrying the invention into effect may be similar to those described in U. S. application S. No. 138,116. Thus, temperatures preferably between 250° and 400° C. and pressures up to 300 atmospheres or more may be employed. Also, the phosphoric acid or other catalyst may be used in a liquid state or distributed over or supported on an inert solid carrier.

The manner in which the invention can be performed is illustrated in the following example, but the invention is not limited thereto.

*Example*

The catalyst mass is prepared by adding 0.5 to 1% of iron or manganese formate to pyro-phosphoric acid. A mixture of methyl alcohol vapour, water vapour, and carbon monoxide is prepared by passing carbon monoxide over or through methyl alcohol maintained at a temperature of about 50–55° C., and afterwards over or through water maintained at about 80° C. The mixture thus prepared is passed continuously under a pressure of about 120–160 atmospheres through the catalyst which is maintained at a temperature of about 290–315° C. A gold-lined reaction vessel containing the catalyst is preferably employed. The products issuing from the reaction chamber are separated by condensation. The condensate contains methyl acetate and acetic acid. The uncondensed gases consisting of methyl alcohol and carbon monoxide may be returned to the reaction vessel for further treatment. Any hydrocarbons or undesired products of reaction may be separated from the circulating gases by passage over active carbon, absorbent charcoal, silica gel, or other suitable absorbent.

The invention is applicable broadly to any of the forms of the process for the synthetic production of carboxylic acids which are described in U. S. application S. No. 138,116. For example, the methyl alcohol may be replaced wholly or in part by dimethyl ether or methyl esters or other compounds capable of decomposing with the separation of a methoxy group or methyl alcohol under the conditions of the reaction. The process may also be employed for the production of acetic acid by the isomerization of methyl formate. Likewise, the carbon monoxide may be used in the form of a mixture with other gases which do not interfere to a material extent with the progress of the reaction.

The phosphoric acids may also be used in the form of the ortho-, meta, or pyro-phosphoric acid, or a mixture of these, or in the form of their acid salts, as indicated in the application S. No. 138,116 before mentioned, and may be replaced by aromatic sulphonic acids or other acid catalysts of the character therein indicated.

The term "inorganic acid catalysts", as used in the description, denotes the catalysts employed in accordance with said U. S. application S. No. 138,116, and is to be construed as to mean an inorganic acidic catalyst containing at least one acid hydroxyl group directly linked to a non-metallic element.

The process is preferably conducted under pressure and at elevated temperatures.

The use of the "promoter" herein described is also of advantage in the synthetic production of other carboxylic acids from alcohols whether in the free or combined form and carbon monoxide by the process described in U. S. application S. No. 138,116.

What I claim and desire to secure by Letters Patent is:—

1. Process for the manufacture of compounds containing an alkacyl group wherein carbon monoxide is caused to react upon a primary aliphatic alcohol in the presence of an inorganic acidic catalyst containing at least one acidic hydroxyl group directly linked to a non-metallic element, characterized in that the reaction is performed in presence of a promoter comprising a metal of atomic weight between 50 and 60.

2. Process according to claim 1, characterized in that the reaction is performed in the presence of water vapor.

3. Process for the manufacture of compounds containing the acetyl group wherein carbon monoxide is caused to react upon methanol in presence of an inorganic acidic catalyst containing at least one acidic hydroxyl group directly linked to a non-metallic element, characterized in that the reaction is performed in presence of a promoter comprising a metal of atomic weight between 50 and 60.

4. Process according to claim 3, characterized in that the reaction is performed in presence of water vapor.

5. Process for the manufacture of compounds containing an alkacyl group wherein carbon monoxide is caused to react upon a primary aliphatic alcohol in presence of an inorganic acidic catalyst containing at least one acidic hydroxyl group directly linked to a non-metallic element, characterized in that the reaction is performed in presence of a compound of a metal of atomic weight between 50 and 60.

6. Process for the manufacture of compounds containing an alkacyl group wherein carbon monoxide is caused to react upon a primary aliphatic alcohol in presence of an inorganic acidic catalyst containing at least one acidic hydroxyl group directly linked to a non-metallic element, characterized in that the reaction is performed in presence of a promotor comprising iron.

7. Process for the manufacture of compounds containing an alkacyl group wherein carbon monoxide is caused to react upon a primary aliphatic alcohol in presence of an inorganic acidic catalyst containing at least one acidic hydroxyl group directly linked to a non-metallic element, characterized in that the reaction is performed in presence of a compound of iron.

8. Process for the manufacture of compounds containing an alkacyl group wherein carbon monoxide is caused to react upon a primary aliphatic alcohol in presence of a phosphoric acid, characterized in that the reaction is performed in presence of a promoter comprising a metal of atomic weight between 50 and 60.

9. Process for the manufacture of compounds containing an alkacyl group wherein carbon monoxide is caused to react upon a primary aliphatic alcohol in presence of a phosphoric acid, characterized in that the reaction is performed in presence of a compound of a metal of atomic weight between 50 and 60.

10. Process for the manufacture of compounds containing the acetyl group wherein carbon monoxide is caused to react upon methanol in presence of an inorganic acidic catalyst containing at least one acidic hydroxyl group directly linked to a non-metallic element, characterized in that the reaction is performed in presence of a compound of a metal of atomic weight between 50 and 60.

11. Process for the manufacture of compounds containing the acetyl group wherein carbon monoxide is caused to react upon methanol in presence of an inorganic acidic catalyst containing at least one acidic hydroxyl group directly linked to a non-metallic element, characterized in that the reaction is performed in presence of a promoter comprising iron.

12. Process for the manufacture of compounds containing the acetyl group wherein carbon monoxide is caused to react upon methanol in presence of a phosphoric acid, characterized in that the reaction is performed in presence of a compound of a metal of atomic weight between 50 and 60.

13. Process for the manufacture of compounds containing the acetyl group wherein carbon monoxide is caused to react upon methanol in presence of a phosphoric acid, characterized in that the reacton is performed in presence of a promoter comprising iron.

14. Process for the manufacture of compounds containing the acetyl group wherein carbon monoxide is caused to react upon methanol in presence of a phosphoric acid, characterized in that the reaction is performed in presence of a compound of iron.

15. Process for the manufacture of compounds containing an alkacyl group wherein carbon monoxide is caused to react upon a primary aliphatic alcohol in presence of an inorganic acidic catalyst containing at least one acidic hydroxyl group directly linked to a non-metallic element, characterized in that the reaction is performed in presence of a promoter comprising manganese.

16. Process for the manufacture of compounds containing the acetyl group wherein carbon monoxide is caused to react upon methanol in presence of an inorganic acidic catalyst containing at least one acidic hydroxyl group directly linked to a non-metallic element, characterized in that the reaction is performed in presence of a promoter comprising manganese.

17. Process for the manufacture of compounds containing an alkacyl group wherein carbon monoxide is caused to react upon a primary aliphatic alcohol in presence of an inorganic acidic catalyst containing at least one acidic hydroxyl group directly linked to a non-metallic element, characterized in that the reaction is performed in presence of a compound of manganese.

18. Process for the manufacture of compounds containing the acetyl group wherein carbon monoxide is caused to react upon methanol in presence of an inorganic acidic catalyst containing at least one acidic hydroxyl group directly linked to a non-metallic element, characterized in that the reaction is performed in presence of a compound of manganese.

19. Process for the manufacture of compounds containing the acetyl group wherein carbon monoxide is caused to react upon methanol in presence of a phosphoric acid, characterized in that the reaction is performed in presence of a compound of manganese.

20. Process for the manufacture of compounds containing the acetyl group wherein carbon monoxide is caused to react upon methanol in presence of a phosphoric acid, characterized in that the reaction is performed in presence of iron formate.

21. Process for the manufacture of compounds containing the acetyl group wherein carbon monoxide is caused to react upon methanol in presence of a phosphoric acid, characterized in that the reaction is performed in presence of manganese formate.

HORACE FINNINGLEY OXLEY.